United States Patent [19]

Dehnert et al.

[11] Patent Number: 4,855,413
[45] Date of Patent: Aug. 8, 1989

[54] HETEROCYCLIC AZO DYES CONTAINING CYANOTHIOPHENE DERIVATIVES AS DIAZO COMPONENTS AND DIAMINOPYRIDINES AS COUPLING COMPONENTS

[75] Inventors: Johannes Dehnert, Ludwigshafen; Gunther Lamm, Hassloch; Hermann Loeffler, Speyer, all of Fed. Rep. of Germany

[73] Assignee: BASF Aktiengesellschaft, Ludwigshafen, Fed. Rep. of Germany

[21] Appl. No.: 188,075

[22] Filed: Apr. 28, 1988

Related U.S. Application Data

[63] Continuation-in-part of Ser. No. 888,956, Jul. 24, 1986, abandoned.

[30] Foreign Application Priority Data

Aug. 10, 1985 [DE] Fed. Rep. of Germany ....... 3528759

[51] Int. Cl.[4] ..................... C09D 11/02; C09B 29/36; D06P 1/02
[52] U.S. Cl. .................................. 534/766; 534/573; 534/733
[58] Field of Search ................................ 534/766, 773

[56] References Cited

U.S. PATENT DOCUMENTS

| | | | |
|---|---|---|---|
| 3,853,895 | 5/1978 | Lamm et al. | 534/766 X |
| 3,998,802 | 12/1976 | Dehnert et al. | 534/766 |
| 4,016,152 | 4/1977 | Dehnert et al. | 534/766 |
| 4,042,578 | 8/1972 | Dehnert et al. | 534/766 |
| 4,092,329 | 5/1978 | Jotterand | 534/766 X |
| 4,108,867 | 8/1978 | Baird et al. | 534/766 X |
| 4,128,545 | 12/1978 | Dehnert et al. | 534/766 |
| 4,264,495 | 4/1981 | Maher et al. | 534/766 X |

FOREIGN PATENT DOCUMENTS

| | | | |
|---|---|---|---|
| 2258823 | 6/1974 | Fed. Rep. of Germany | 534/766 |
| 2404854 | 8/1975 | Fed. Rep. of Germany | 534/766 |
| 2219205 | 9/1974 | France | 534/766 |

*Primary Examiner*—Floyd D. Higel
*Attorney, Agent, or Firm*—Oblon, Spivak, McClelland, Maier & Neustadt

[57] ABSTRACT

The novel dyes of the general formula I

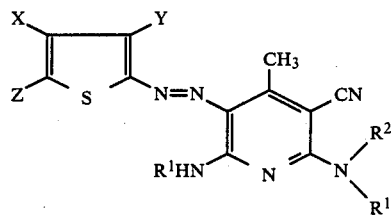

where X is hydrogen or $C_1$–$C_4$-alkyl or is phenyl which is unsubstituted or substituted by fluorine, chlorine, bromine, methyl, methoxy or nitro, Y is cyano, a carboxylic ester group or nitro, Z is cyano, acetyl, benzoyl or unsubstituted or substituted carbamyl, or X and Z or Y and Z may simultaneously be a carboxylic ester group, and $R^1$ and $R^2$ independently of one another are each hydrogen or unsubstituted or substituted alkyl or aryl, are very useful for dyeing polyesters, polyester/cellulose blends or thermoplastics.

6 Claims, No Drawings

HETEROCYCLIC AZO DYES CONTAINING CYANOTHIOPHENE DERIVATIVES AS DIAZO COMPONENTS AND DIAMINOPYRIDINES AS COUPLING COMPONENTS

This application is a continuation-in-part of application Ser. No. 06/888,956, filed on July 24, 1986, now abandoned.

The present invention relates to compounds of the general formula I

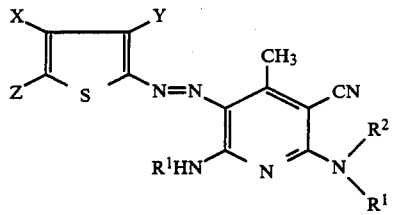

where X is hydrogen or $C_1$-$C_4$-alkyl or is phenyl which is unsubstituted or substituted by fluorine, chlorine, bromine, methyl, methoxy or nitro, Y is cyano, a carboxylic ester group or nitro, Z is cyano, acetyl, benzoyl or unsubstituted or substituted carbamyl, or X and Z or Y and Z may simultaneously be a carboxylic ester group, and $R^1$ and $R^2$ independently of one another are each hydrogen or unsubstituted or substituted alkyl or aryl.

Examples of substituted carbamyl radicals Z are $CONHR^3$ or

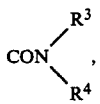

where $R^3$ is unsubstituted or substituted alkyl or phenyl or cyclohexyl, $R^4$ is unsubstituted or substituted alkyl and $R^3$ and $R^4$ together with the nitrogen may form a heterocyclic ring. Specific examples are $CONHCH_3$, $CONHC_2H_5$, $CONH$—n—$C_3H_7$, $CONH$—n—$C_4H_9$, $CONHCH_2CH(CH_3)_2$, $CONHC_2H_4OCH_3$, $CONHC_3H_6OCH_3$, $CONHC_2H_4OH$, $CONHC_3H_6OH$, $CONHC_6H_5$, $CONHC_6H_4CH_3$, $CONHC_6H_4OCH_3$, $CON(CH_3)_2$, $CON(C_2H_5)_2$, $CON(C_2H_4OCH_3)_2$ and $CON(CH_3)C_6H_5$.

Preferred carboxylic ester groups Y and, where relevant, X and Z are $COOCH_3$, $COOC_2H_5$, $COOC_3H_7$, $COOC_4H_9$ and $COOC_2H_4OCH_3$.

Examples of radicals $R^1$ and $R^2$ in addition to hydrogen are:

1. Unsubstituted or substituted alkyl, such as $CH_3$, $C_2H_5$, n-$C_3H_7$,

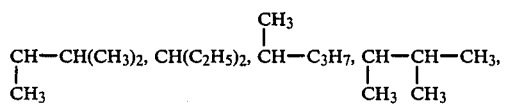

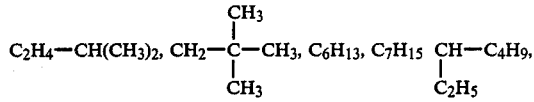

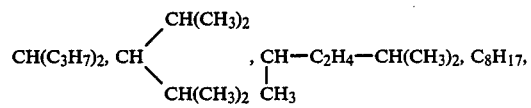

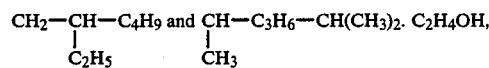

$C_3H_6OH$, $CH_2$—CH—OH, CH—$CH_2$—OH, $C_4H_8OH$,
              |        |
              $CH_3$ $CH_3$

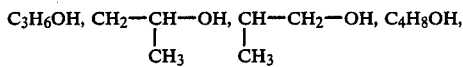

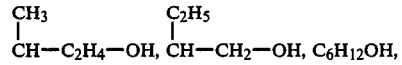

$C_2H_4OC_4H_9$, $C_2H_4OC_6H_5$, $C_2H_4OC_6H_{11}$, $C_2H_4CN$, $C_5H_{10}CN$, $C_6H_{12}CN$, $C_2H_4OC_2H_4CN$, $C_3H_6OC_2H_4CN$, $C_3H_6OCH_3$,

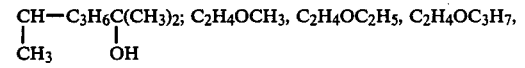

$C_3H_6OC_6H_{11}$, $C_3H_6OC_8H_{17}$, $C_3H_6OCH_2C_6H_5$, $C_3H_6OC_2H_4C_6H_5$, $C_3H_6OC_2H_4OC_6H_5$, $C_3H_6OC_6H_5$, $C_3H_6OC_2H_4OH$, $C_3H_6OC_4H_8OH$, $C_3H_6OC_2H_4OCH_3$, $C_3H_6OC_2H_4OC_2H_5$, $C_3H_6OC_2H_4OCH(CH_3)_2$, $C_3H_6OC_2H_4OC_4H_9$, $C_3H_6OC_2H_4OCH_2C_6H_5$, $C_3H_6OC_2H_4OC_6H_5$, $C_3H_6OC_4H_8OCH_3$, $C_3H_6OC_4H_8OC_2H_5$, $C_3H_6OC_4H_8OC_4H_9$,

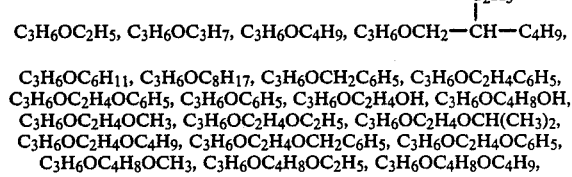

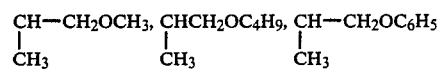

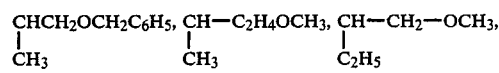

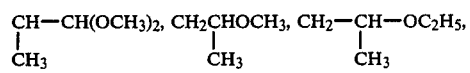

the corresponding radicals which contain two $C_2H_4O$, $C_3H_6O$,

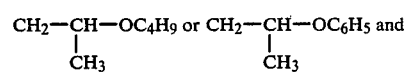
or $CH_2$—CHO groups; and
       |
      $CH_3$

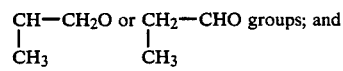

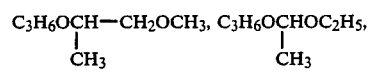

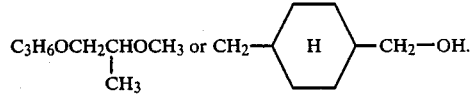

2. Unsubstituted or substituted cycloalkyl:

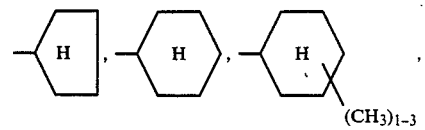

-continued

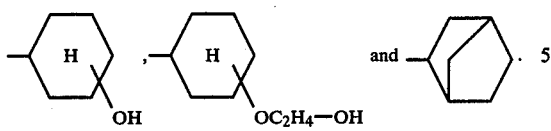

3. Unsubstituted or substituted aralkyl:

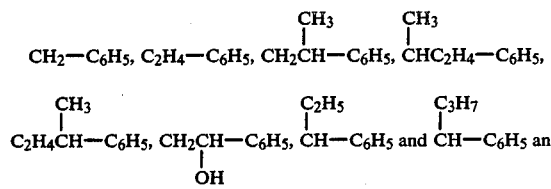

where n = 2, 3, 4 or 6.

6. Acyloxy radicals: $(CH_2)_2OCHO$, $(CH_2)_2OCO(CH_2)_nCH_3$, $(C_2H_4O)_2CHO$, $(C_2H_4O)_2CO(CH_2)_nCH_3$, $(CH_2)_3O(CH_2)_2OCHO$, $(CH_2)_3O(CH_2)_2OCO(CH_2)_nCH_3$, $(CH_2)_2O(CH_2)_4OCHO$, and $(CH_2)_2O(CH_2)_4OCO(CH_2)_nCH_3$, where n is from 0 to 7, and

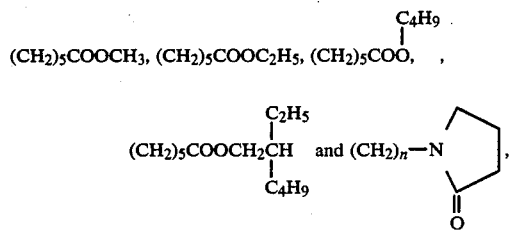

$(CH_2)_2OCOC_6H_4Cl$, $(CH_2)_2OCONHCH_3$, $(CH_2)_2OCONHC_4H_9$,

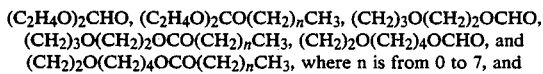

the corresponding radicals containing $(CH_2)_3$ or $(CH_2)_4$ instead of $(CH_2)_2$.

7. Acyl radicals: CHO, $CH_3(CH_2)_nCO$, where n is from 0 to 7, $C_6H_5CO$, $CH_3C_6H_4CO$, $C_6H_5CH_2CO$, $C_6H_5OCH_2CO$, $CH_3SO_2$, $C_2H_5SO_2$, $C_6H_5SO_2$ and $CH_3C_6H_4SO_2$.

The compounds of the formula I can be prepared by reacting a diazonium compound of an amine of the formula

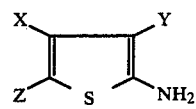

with a coupling component of the formula

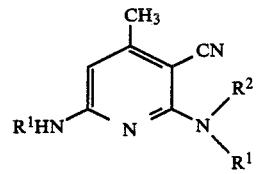

in a conventional manner. The Examples which follow illustrate the preparation, parts and percentages stated in the Examples being by weight, unless stated otherwise. The λ max values were determined in a mixture of dimethylformamide and glacial acetic acid in a ratio of 9:1.

The compounds of the formula I give deep, brilliant and very lightfast dyeings, in particular on polyester. They are also very useful for dyeing thermoplastics, such as polystyrene, polymethacrylate, polycarbonate, nylon and styrene/acrylic acid/butadiene copolymers, since they possess high color strength, lightfastness and thermal stability. Many novel dyes are also useful for dyeing and/or printing polyester/cotton blends in hues which are very lightfast and fast to laundering, by the method described in German Pat. No. 1,811,796.

The yield of the dyes disclosed herein is not dependent on the pH value of the dye bath. Therefore, the present dyes would be considered useful in industrial application. Particularly, dyes for dying polyester such as those in the present invention are required to possess this property.

Of particular importance are dyes of the general formula Ia

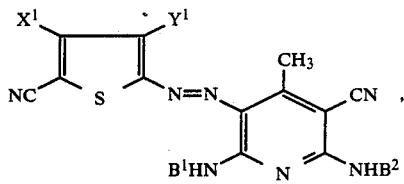

where $X^1$ is hydrogen, methyl or phenyl, $Y^1$ is cyano or a carboxylic ester group and $B^1$ and $B^2$ independently of one another are each $C_2$–$C_8$-alkyl which may be interrupted by oxygen and is unsubstituted or substituted by hydroxyl, $C_1$–$C_8$-alkanoyloxy, $C_1$–$C_4$-alkoxy, benzyloxy or phenoxy, or are each phenyl which is unsubstituted or substituted by methyl or methoxy.

Preferred carboxylic ester groups are $COOCH_3$ and $COOC_2H_5$.

Examples of particularly preferred radicals $B^1$ and $B^2$ are hydrogen and the radicals $C_2H_5$, $C_3H_7$, $C_4H_9$,

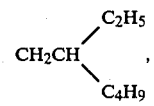

$C_6H_{11}$, $C_6H_5$, $C_6H_4CH_3$, $C_6H_4OCH_3$, $C_2H_4OH$, $C_3H_6OH$, $C_2H_4OCH_3$, $C_3H_6OCH_3$, $C_2H_4OC_2H_5$, $C_2H_4OC_4H_9$, $C_3H_6OC_2H_5$, $C_2H_4OC_2H_4OH$, $C_3H_6OC_2H_4OH$, $C_3H_6OC_4H_8OH$, $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_2H_4OC_2H_4OCO(CH_2)_mCH_3$, $C_3H_6OC_2H_4OCO(CH_2)_mCH_3$, $C_3H_6OC_4H_8OCO(CH_2)_mCH_3$, $C_2H_4OCO(CH_2)_mCH_3$, $C_3H_6OCO(CH_2)_mCH_3$, $C_3H_6OCH_2C_6H_5$ and $C_3H_6OC_2H_4OC_6H_5$, where m is from 1 to 4.

Examples of particularly preferred combinations of $B^1$ and $B^2$ are hydrogen and $C_2H_4OC_2H_4OCOCH_3$, $C_2H_4OC_2H_4OCOC_2H_5$, $C_3H_6OC_4H_8OH$, $C_3H_6OC_4H_8OCOCH_3$, $C_3H_6OC_4H_8OCOC_2H_5$, $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_3H_6OCH_2C_6H_5$, $C_3H_6OC_2H_4OC_6H_5$ or $C_3H_6OCH_2-CH(C_2H_5)C_4H_9$ and $C_2H_5$, $C_2H_4OCH_3$, $C_3H_6OCH_3$, $CH(CH_3)_2$ or $C_4H_9$ in combination with $C_2H_4OC_2H_4OCOCH_3$, $C_3H_6OC_4H_8OH$, $C_3H_6OC_4H_8OCHO$, $C_3H_6OC_4H_8OCOCH_3$, $C_3H_6OC_4H_8OCOC_2H_5$, $C_3H_6OC_2H_4OC_4H_9$, $C_3H_6OC_4H_8OC_2H_5$, $C_3H_6OC_4H_8OC_4H_9$ or $C_3H_6OC_2H_4OC_6H_5$ and $C_2H_4OH$, $C_3H_6OH$, $C_2H_4OCOCH_3$, $C_2H_4OCOC_2H_5$, $C_3H_6OCOCH_3$ or $C_3H_6OCOC_2H_5$ combined with $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_6H_4OCH_3$ or $C_6H_5$.

The process for the preparation of the 2,6-diaminopyridines which are substituted by acyloxyalkyl or acyloxyalkoxyalkyl and are free of by-products is also particularly important.

To date, azo dyes possessing such coupling components have had to be prepared by subsequent acylation of the corresponding hydroxyl-containing dyes in an anhydrous organic solvent with an acyl halide or an anhydride, since the coupling components themselves preferentially undergo N-acylation under these conditions; the N-acyl-2,6-diaminopyridines, however, are not capable of coupling.

According to the invention, the coupling components are prepared by adding not less than an equivalent amount of sulfuric acid to a solution or suspension of the hydroxyl-containing substituted pyridine in the desired organic acid and stirring at from 20° to 100° C., preferably from 20° to 50° C. The degree of acylation depends on the water content and reaches 100% in an anhydrous medium. However, the absence of water and 100% conversion are not necessary in every case in order to achieve optimum tinctorial properties. In most cases, a conversion of from 70 to 90% is sufficient; this conversion does not require anhydrous conditions and advantageously permits the acylation to be combined with the preparation of the hydroxyalkylaminopyridine.

The coupling components are, as a rule, isomer mixtures in which the substituents in the 2,6-positions are interchanged; however, different amounts of the isomers are present, depending on the preparation.

EXAMPLE 1

16.3 parts of 2-amino-3,5-dicyano-4-methylthiophene are dissolved in 250 parts of 65% strength sulfuric acid, while cooling. 31.5 parts of 40% strength nitrosylsulfuric acid are added dropwise at from 0° to +5° C. while cooling further, and the mixture is stirred for a further 1½ hours at this temperature. The coupling component used is obtained as follows: a thoroughly stirred mixture of 17 parts (based on dry substance) of water-moist 2-chloro-3-cyano-4-methyl-6-aminopyridine (obtained, for example, by the process described in German Pat. No. 2,260,827), 20 parts by volume of isobutanol, 18 parts of 3-aminopropyl 4-hydroxybutyl ether and 8 parts of sodium carbonate is heated at 145°–150° C. for 5 hours under a descending condenser until a thin layer chromatogram shows that conversion is complete. The mixture is cooled to about 100° C., after which 35 parts of acetic acid are added dropwise, followed by the dropwise addition of 15 parts of 96% strength sulfuric acid at 35°–40° C. with further slight cooling. The mixture is stirred for 3 hours, after which about 92% of the hydroxy compound is acetylated. A solution of the diazonium salt is run into the thoroughly stirred mixture of 100 parts of the coupling components thus obtained, 300 parts of ice and 100 parts of water, and stirring is continued for about 2 hours at 0°–5° C. until the solution has been consumed. Thereafter, the coupling mixture is filtered under suction and the residue is washed neutral and dried at 80° C. The dark green powder (λmax=527 in 9:1 dimethylformamide/acetic acid) contains about 80% of a product of the formula

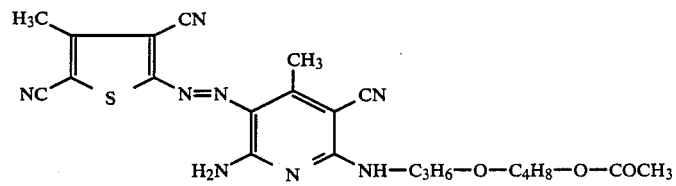

and about 20% of the unacetylated hydroxy compound. The dye mixture has very good tinctorial properties and, on polyester, gives brilliant red dyeings having very good lightfastness and fastness to plating.

EXAMPLE 2

If an equivalent amount of the coupling component described below is used under the preparation conditions of Example 1, the red dye (λmax=537.8 nm in 9:1 dimethylformamide/acetic acid) of the formula

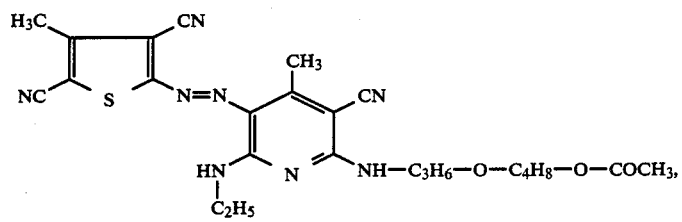

is obtained. This dye also contains about 20% of the hydroxy compound and dyes polyester in brilliant bluish red hues. The dyeings are very lightfast and fast to plating.

The coupling component is obtained as follows: 20 parts of 2-chloro-3-cyano-4-methyl-6-ethylaminopyridine (obtained as described in German Pat. No. 2,260,827) in 20 parts by volume of isobutanol are heated with 18 parts of 3-aminopropyl-4-hydroxybutyl ether and 10.5 parts of sodium carbonate at 145° C., isobutanol and water being distilled off. Stirring is continued for 4 hors at 145°–150° C., until a thin layer chromatogram shows that conversion is complete. During cooling, from about 100° C., 30 parts by volume of glacial acetic acid are added dropwise, followed by the dropwise addition of 15 parts of 96% strength sulfuric acid at 40° C. while cooling with water. By stirring for 3 hours at 40° C., a conversion of about 93% is achieved.

The dyes shown in the Table below are obtained in a similar manner and likewise possess very good lightfastness and thermal stability.

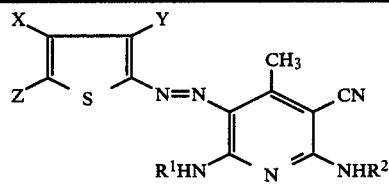

| Example No. | X | Y | Z | R$^1$ | R$^2$ | λ max nm |
|---|---|---|---|---|---|---|
| 3 | CH$_3$ | CN | CN | H | C$_3$H$_6$OC$_4$H$_8$OCOCH$_3$ | 526 |
| 4 | CH$_3$ | CN | CN | H | C$_3$H$_6$OC$_4$H$_8$OCOC$_2$H$_5$ | 527 |
| 5 | CH$_3$ | CN | CN | H | C$_3$H$_6$OC$_4$H$_8$OCOCH$_2$CH(CH$_3$)$_2$ | 527.5 |
| 6 | CH$_3$ | COOC$_2$H$_5$ | CN | H | C$_3$H$_6$OC$_4$H$_8$OCOCH$_3$ | 518 |
| 7 | CH$_3$ | COOC$_2$H$_5$ | CN | H | C$_3$H$_6$OC$_4$H$_8$OCH$_2$CH(CH$_3$)$_2$ | 518.5 |
| 8 | CH$_3$ | CN | CN | H | C$_3$H$_6$OC$_2$H$_4$OCH$_3$ | 528.5 |
| 9 | CH$_3$ | CN | CN | H | C$_3$H$_6$OC$_2$H$_4$OC$_2$H$_5$ | 523 |
| 10 | CH$_3$ | CN | CN | H | C$_3$H$_6$OC$_2$H$_9$OC$_4$H$_9$ | 523 |
| 11 | CH$_3$ | COOC$_2$H$_5$ | CN | H | C$_3$H$_6$OC$_4$H$_8$OC$_2$H$_5$ | 521.2 |
| 12 | CH$_3$ | COOCH$_3$ | CN | H | C$_3$H$_6$OC$_4$H$_8$OC$_4$H$_9$ | 520.2 |
| 13 | CH$_3$ | COOC$_2$H$_5$ | CN | H | C$_3$H$_6$OC$_4$H$_8$OC$_4$H$_9$ | 520 |
| 14 | CH$_3$ | COOC$_2$H$_5$ | CN | H | C$_3$H$_6$OC$_2$H$_4$OC$_4$H$_9$ | 522.7 |
| 15 | CH$_3$ | COOC$_3$H$_7$ | CN | H | C$_3$H$_6$OC$_2$H$_4$OCH$_3$ | 523.2 |
| 16 | CH$_3$ | CN | CN | H | C$_3$H$_6$OC$_4$H$_8$OCOCH$_3$ C$_3$H$_6$OC$_2$H$_4$OC$_4$H$_9$ | 525 |
| 17 | CH$_3$ | CN | CN | C$_2$H$_4$OCH$_3$ | C$_3$H$_6$OC$_4$H$_8$OH | 534.3 |
| 18 | CH$_3$ | CN | CN | C$_2$H$_4$OCH$_3$ | C$_3$H$_6$OC$_4$H$_8$OCOCH$_3$ | 535.8 |
| 19 | CH$_3$ | CN | CN | C$_2$H$_4$OCOCH$_3$ | C$_3$H$_6$OC$_2$H$_4$OC$_2$H$_5$ | 535.3 |
| 20 | CH$_3$ | CN | CN | C$_2$H$_4$OH | C$_3$H$_6$OC$_2$H$_4$OC$_2$H$_5$ | 535.8 |
| 21 | CH$_3$ | CN | CN | C$_2$H$_4$OCOCH$_3$ | C$_2$H$_4$OC$_2$H$_5$ | 533.8 |
| 22 | CH$_3$ | CN | CN | C$_3$H$_6$OCH$_3$ | C$_3$H$_6$OC$_2$H$_4$OC$_4$H$_9$ | 537.8 |
| 23 | CH$_3$ | CN | CN | C$_3$H$_6$OCH$_3$ | C$_3$H$_6$OC$_4$H$_8$OH | 536.3 |
| 24 | CH$_3$ | COOC$_2$H$_5$ | CN | C$_3$H$_6$OH | –⟨phenyl⟩ | 542 |
| 25 | CH$_3$ | COOC$_2$H$_5$ | CN | C$_3$H$_6$OCOCH$_3$ | –⟨phenyl⟩ | 541.3 |

-continued

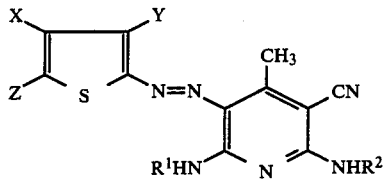

| Example No. | X | Y | Z | R$^1$ | R$^2$ | λ max nm |
|---|---|---|---|---|---|---|
| 26 | CH$_3$ | COOC$_2$H$_5$ | CN | H | C$_3$H$_6$OCH$_2$−CH(C$_2$H$_5$)(C$_4$H$_9$) | 524 |
| 27 | CH$_3$ | COOC$_2$H$_5$ | COOCH$_3$ | H | C$_3$H$_6$OC$_4$H$_8$OC$_2$H$_5$ | 512.7 |
| 28 | CH$_3$ | COOC$_2$H$_5$ | COOCH$_3$ | H | C$_3$H$_6$OC$_4$H$_8$OC$_4$H$_9$ | 511.7 |
| 29 | CH$_3$ | COOC$_2$H$_5$ | COOCH$_3$ | C$_3$H$_6$OCH$_3$ | C$_3$H$_6$OCH$_3$ | 523.2 |
| 30 | CH$_3$ | COOC$_2$H$_5$ | COOCH$_3$ | C$_3$H$_6$OCH$_3$ | C$_3$H$_6$OC$_4$H$_8$OC$_4$H$_9$ | 526 |
| 31 | CH$_3$ | CN | CN | H | C$_3$H$_6$OC$_4$H$_8$OC$_2$H$_5$ | 525.3 |
| 32 | CH$_3$ | CN | CN | H | C$_3$H$_6$OC$_4$H$_8$OC$_4$H$_9$ | 525.8 |
| 33 | CH$_3$ | CN | CN | H | C$_3$H$_6$OC$_2$H$_4$O−C$_6$H$_5$ | 528 |
| 34 | CH$_3$ | CN | CN | H | C$_3$H$_6$OCH$_2$−CH(C$_2$H$_5$)(C$_4$H$_9$) | 528 |
| 35 | CH$_3$ | CN | CN | H | C$_6$H$_5$ | 538.8 |
| 36 | CH$_3$ | CN | CN | H | −C$_6$H$_4$−OCH$_3$ (p) | 547.5 |
| 37 | CH$_3$ | COOC$_2$H$_5$ | COOCH$_3$ | H | C$_3$H$_6$OC$_4$H$_8$OCOC$_2$H$_5$ | 517.7 |
| 38 | CH$_3$ | COOC$_2$H$_5$ | COOCH$_3$ | H | C$_3$H$_6$OC$_4$H$_8$OCOCH$_3$ | 517.8 |
| 39 | CH$_3$ | CN | CN | C$_3$H$_6$OCOCH$_3$ | −C$_6$H$_4$−OCH$_3$ (o) | 547.8 |
| 40 | CH$_3$ | CN | CN | C$_3$H$_6$OCOCH$_3$ | −C$_6$H$_4$−OCH$_3$ | 553.8 |
| 41 | CH$_3$ | CN | CN | C$_3$H$_6$OCOCH$_3$ | C$_6$H$_5$ | 546.3 |
| 42 | CH$_3$ | CN | CN | C$_6$H$_5$ | C$_3$H$_6$OCOCH$_3$ | 548.3 |

-continued

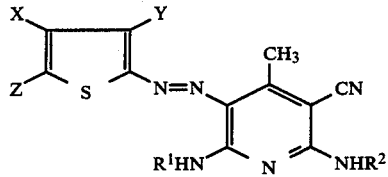

| Example No. | X | Y | Z | R¹ | R² | λ max nm |
|---|---|---|---|---|---|---|
| 43 | $CH_3$ | CN | CN | 2-methoxyphenyl (H₃CO at ortho) | $C_3H_6OCOCH_3$ | 550.8 |
| 44 | $CH_3$ | CN | CN | cyclohexyl | 2-methoxyphenyl | 549 |
| 45 | $CH_3$ | CN | CN | $C_3H_6OH$ | phenyl | 549 |
| 46 | $CH_3$ | CN | CN | $C_3H_6OH$ | 4-methoxyphenyl | 554 |
| 47 | $CH_3$ | CN | CN | cyclohexyl | 4-methoxyphenyl | 555 |
| 48 | $CH_3$ | CN | CN | $C_3H_6OCH_3$ | $C_3H_6OCH_3$ | 534.3 |
| 49 | $CH_3$ | CN | CN | $C_2H_4OCH_3$ | $C_2H_4OCH_3$ | 535.3 |
| 50 | $CH_3$ | CN | $CON(C_2H_5)_2$ | H | $C_3H_6OC_4H_8OCOCH_3$ | 507.5 |
| 51 | $CH_3$ | CN | $CON(C_2H_5)_2$ | H | $C_3H_6OC_2H_4OCH_3$ | 511 |
| 52 | $CH_3$ | CN | $CON(C_2H_5)_2$ | H | $CH(CH_3)CH-OCH_3$ | 510.2 |
| 53 | $CH_3$ | $COOC_2H_5$ | $CH_3CO$ | $C_2H_5$ | $C_3H_6OC_4H_8OCOCH_3$ | 528.8 |
| 54 | $CH_3$ | $COOC_2H_5$ | $CH_3CO$ | H | $C_3H_6OC_4H_8OCOCH_3$ | 517.7 |
| 55 | $CH_3$ | $COOC_2H_5$ | $COOCH_3$ | $C_2H_5$ | $C_3H_6OC_2H_4OC_4H_9$ | 535 |
| 56 | $CH_3$ | $COOC_2H_5$ | CN | H | $C_3H_6OC_2H_4O$-phenyl | 524 |
| 57 | $CH_3$ | $COOC_2H_5$ | CN | H | phenyl | 532.5 |
| 58 | $CH_3$ | $COOC_2H_5$ | CN | H | 2-methoxyphenyl | 534 |
| 59 | $CH_3$ | CN | CN | H | $C_2H_4OC_2H_4OCOC_2H_5$ | 525.8 |
| 60 | $CH_3$ | CN | CN | H | $C_2H_4OC_2H_4OH$ | 527.3 |
| 61 | $CH_3$ | CN | CN | $C_2H_5$ | $C_3H_6OC_4H_8OCOC_2H_5$ | 537.3 |
| 62 | $CH_3$ | CN | CN | $C_2H_5$ | $C_3H_6OC_2H_4OC_4H_9$ | 535.8 |
| 63 | $CH_3$ | CN | CN | $C_2H_5$ | $C_3H_6OC_2H_4OH$ | 535.8 |
| 64 | $CH_3$ | CN | CN | $C_3H_6OCH_3$ | $C_3H_6OC_4H_8OCOCH_3$ | 537.8 |
| 65 | $CH_3$ | CN | CN | $C_3H_6OC_2H_4OCH_3$ | $C_2H_4OH$ | 536.3 |
| 66 | $CH_3$ | CN | CN | $C_3H_6OC_2H_4OCH_3$ | $C_2H_4OCOC_2H_5$ | 535.8 |

-continued

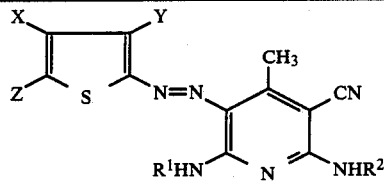

| Example No. | X | Y | Z | R¹ | R² | λ max nm |
|---|---|---|---|---|---|---|
| 67 | $CH_3$ | CN | CN | H | $CH(CH_3)CH_2-OCH_3$ | 526.3 |
| 68 | $CH_3$ | CN | CN | $CH(CH_3)_2$ | $C_3H_6OC_4H_8OCOCH_3$ | 537.8 |
| 69 | phenyl | CN | CN | H | $C_3H_6O(C_2H_4O)_2C_2H_5$ | 523 |
| 70 | $CH_3$ | CN | CN | $C_3H_6OC_4H_8OCOCH_3$ | H | 522 |
| 71 | $CH_3$ | CN | CN | $CH(C_2H_5)CH_2OCOCH_3$ | H | 518 |
| 72 | $CH_3$ | CN | CN | $CH(CH_3)C_2H_4OCOCH_3$ | H | 518 |
| 73 | $CH_3$ | CN | CN | $CH(CH_3)C_3H_6CH(CH_3)_2$ | H | 523 |
| 74 | $CH_3$ | CN | CN | $CH(CH_3)C_3H_6C(CH_3)_2OH$ | H | 522 |
| 75 | $CH_3$ | CN | CN | $C_3H_6OCH(CH_3)CH_2OCH_3$ | H | 522 |
| 76 | $CH_3$ | CN | CN | $C_3H_6OCH_2CH(CH_3)OCH_3$ | H | 523 |
| 77 | $CH_3$ | CN | CN | $C_3H_6O(C_2H_4O)_2C_2H_5$ | H | 522 |

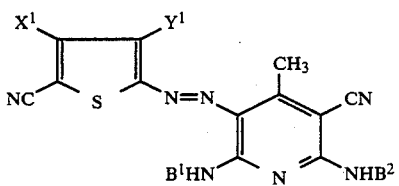

| Example No. | R¹ | R² | R³ | λ max. [nm] (Acetone) |
|---|---|---|---|---|
| 78 | $C_3H_6OCH_3$ | $CH_3$ | $C_2H_4OCH_3$ | 543 |
| 79 | $C_3H_6OCH_3$ | $C_2H_5$ | $C_2H_5$ | 544 |
| 80 | $C_3H_6OCH_3$ | $C_4H_9$ | $C_2H_4OCH_3$ | 544 |
| 81 | $C_3H_6OCH_3$ | $C_2H_4OCH_3$ | $C_2H_4OH$ | 543 |
| 82 | $C_3H_6OCH_3$ | $C_2H_5$ | $C_2H_4OCOCH_3$ | 544 |
| 83 | $C_2H_4OCH_3$ | $C_4H_9$ | $C_2H_4OCOCH_3$ | 542 |
| 84 | $C_2H_5$ | $C_4H_9$ | $C_2H_4OCOCH_3$ | 544 |
| 85 | $C_3H_6OCOCH_3$ | pyrrolidine | | 544 |
| 86 | $C_3H_6OCOCH_3$ | piperidine | | 544 |

We claim:
1. A compound of the formula I

$$\begin{array}{c} X^1 \quad Y^1 \\ NC-\underset{S}{\bigcirc}-N=N-\underset{B^1HN}{\bigcirc}(CH_3)(CN)-NHB^2 \end{array}$$

where $X_1$ is hydrogen or methyl, $Y_1$ is cyano, and
$B^1$ and $B^2$ independently of one another are each hydrogen or
(i) $C_2$–$C_8$-alkyl which is unsubstituted;
(ii) $C_2$–$C_8$-alkyl which is substituted by hydroxyl, $C_1$–$C_8$-alkanoyloxy, $C_1$–$C_4$-alkoxy, benzyloxy, or phenoxy;
(iii) $C_2$–$C_8$-alkyl which is interrupted by oxygen exclusive of (ii);
(iv) $C_2$–$C_8$-alkyl which is interrupted by oxygen and substituted by hydroxy, $C_1$–$C_8$-alkanoyloxy, $C_1$–$C_4$-alkoxy, benzyloxy or phenoxy, exclusive of (ii) and (iii); '(v) phenyl which is unsubstituted; or
(vi) phenyl which is substituted by methyl or methoxy.

2. A compound as claimed in claim 1, where X is methyl.

3. A compound as claimed in claim 1, where one of the radicals $B^1$ and $B^2$ is hydrogen and the other is $C_2H_4OC_2H_4OCOCH_3$, $C_2H_4OC_2H_4OCOC_2H_5$, $C_3H_6OC_4H_8OH$, $C_3H_6OC_4H_8OCOCH_3$, $C_3H_6OC_4H_8OCOC_2H_5$, $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_3H_6OCH_2C_6H_5$, $C_3H_6OC_2H_4OC_6H_5$ or $C_3H_6OCH_2$-$CH(C_2H_5)C_4H_9$, or where one of the radicals $B^1$ and $B^2$ is $C_2H_5$, $C_2H_4OCH_3$, $C_3H_6OCH_3$, $CH(CH_3)_2$, or $C_4H_9$ and the other is $C_2H_4OC_2H_4OCOCH_3$, $C_3H_6OC_4H_8OH$, $C_3H_6OC_4H_8OCHO$, $C_3H_6OC_4H_8OCOCH_3$, $C_3H_6OC_4H_8OCOC_2H_5$, $C_3H_6OC_2H_4OC_4H_9$, $C_3H_6OC_4H_8OC_2H_5$, $C_3H_6OC_4H_8OC_4H_9$ or $C_3H_6OC_2H_4OC_6H_5$ or where one of the radicals $B^1$ and $B^2$ is $C_2H_4OH$, $C_3H_6OH$, $C_2H_4OCOCH_3$, $C_2H_4OCOC_2H_5$, $C_3H_6OCOCH_3$ or $C_3H_6OCOC_2H_5$ and the other is $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_6H_4OCH_3$ or $C_6H_5$.

4. A compound as claimed in claim 1, where one of the radicals $B^1$ and $B^2$ is hydrogen and the other is $C_2H_4OC_2H_4OCOCH_3$, $C_2H_4OC_2H_4OCOC_2H_5$, $C_3H_6OC_4H_8OH$, $C_3H_6OC_4H_8OCOCH_3$, $C_3H_6OC_4H_8OCOC_2H_5$, $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_3H_6OCH_2C_6H_5$, $C_3H_6OC_2H_4OC_6H_5$ or $C_3H_6OCH_2\text{-}CH(C_2H_5)C_4H_9$.

5. A compound as claimed in claim 1, where one of the radicals $B^1$ and $B^2$ is $C_2H_5$, $C_2H_4OCH_3$, $C_3H_6OCH_3$, $CH(CH_3)_2$ or $C_4H_9$ and the other is $C_2H_4OC_2H_4OCOCH_3$, $C_3H_6OC_4H_8OH$, $C_3H_6OC_4H_8OCHO$, $C_3H_6OC_4H_8OCOCH_3$, $C_3H_6OC_4H_8OCOC_2H_5$, $C_3H_6OC_2H_4OC_4H_9$, $C_3H_6OC_4H_8OC_2H_5$, $C_3H_6OC_4H_8OC_4H_9$ or $C_3H_6OC_2H_4OC_6H_5$.

6. A compound as claimed in claim 1, where one of the radicals $B^1$ and $B^2$ is $C_2H_4OH$, $C_3H_6OH$, $C_2H_4OCOCH_3$, $C_2H_4OCOC_2H_5$, $C_3H_6OCOCH_3$ or $C_3H_6OCOC_2H_5$ and the other is $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_6H_4OCH_3$ or $C_6H_5$.

* * * * *